Aug. 18, 1959  E. A. LAURING  2,900,184
DRILL REMOVING MEANS FOR MULTIPLE SPINDLE DRILL
Filed Dec. 27, 1957
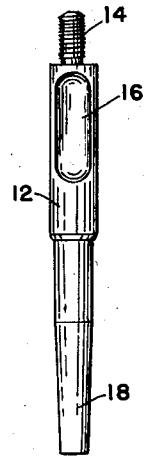
FIG. 3
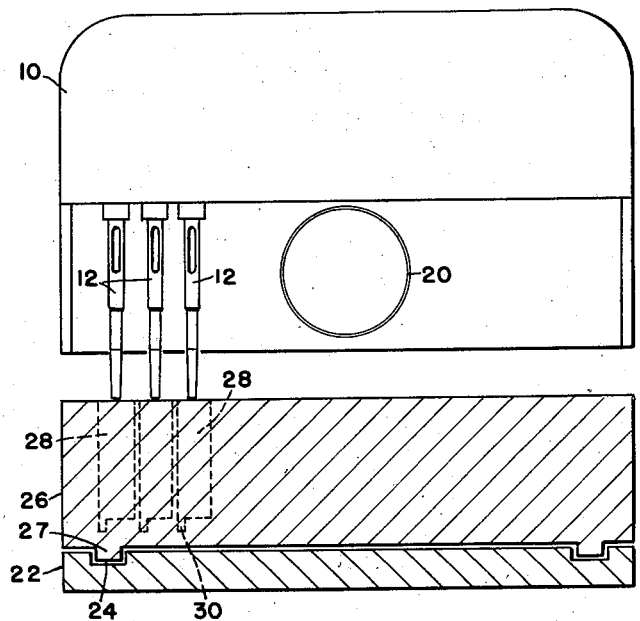
FIG. 1
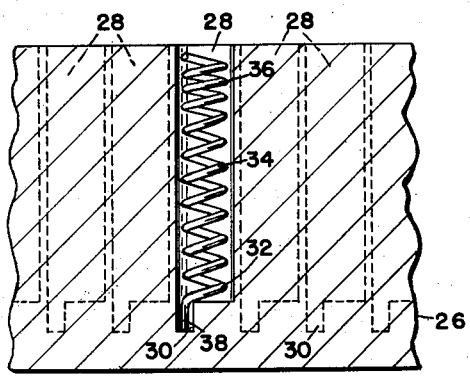
FIG. 2
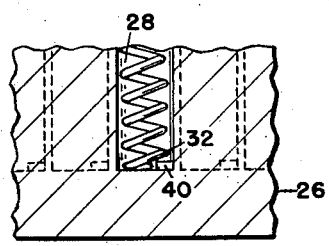
FIG. 4
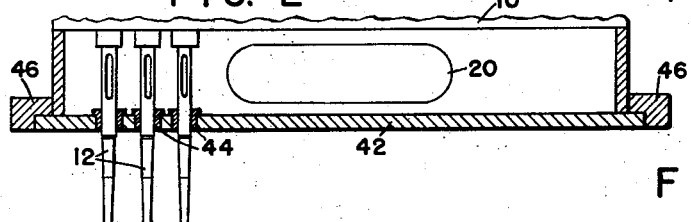
FIG. 5
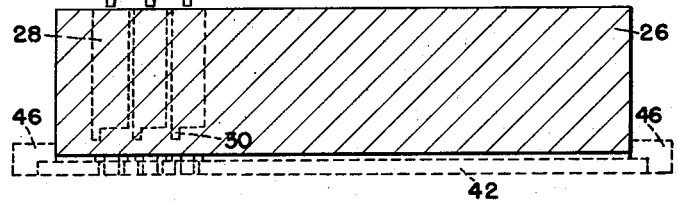
INVENTOR.
EDGAR A. LAURING
BY H. F. Woodward
atty

United States Patent Office 2,900,184
Patented Aug. 18, 1959

2,900,184

DRILL REMOVING MEANS FOR MULTIPLE SPINDLE DRILL

Edgar A. Lauring, International Falls, Minn., assignor to Minnesota and Ontario Paper Company, Minneapolis, Minn.

Application December 27, 1957, Serial No. 705,536

3 Claims. (Cl. 269—127)

This invention relates to an apparatus for removing drills in a multiple spindle drill adapted for drilling the perforations in an acoustical material requiring a large number of perforations within a relatively small area. The invention having for its object the providing of an apparatus which will be simple and efficient in operation in removing all drills quickly.

With these and other objects in view, the invention resides in the novel details of construction and the combination of parts constituting the apparatus all as will be disclosed more fully hereinafter.

Figure 1 is a view of an acoustical drilling head with only part of the drills in place and with the drill removing platen in operating position with the drill removing springs removed;

Figure 2 is a sectional view of the drill removing platen with portions broken away and only one spring-like member in place;

Figure 3 is a side elevational view of a drill of the general type employed;

Figure 4 is a sectional view of a modified platen with portions broken away; and Figure 5 is a modified form of the arrangement shown in Figure 1 with parts broken away.

In producing sound absorbing boards of fibrous material such as wood fiber and/or pulp and the like, soft boards are provided with holes bored from one side and generally not extending therethrough. There is employed a drill head similar to that shown in U.S. Patent No. 2,615,525 or 2,684,093 for perforating fiber insulation board to form an acoustical correction material. Such fibrous material when utilized as an acoustical correction material is preferably formed into boards substantially 12 inches by 12 inches or multiples thereof and substantially ½ inch to about 1½ inches in thickness, depending upon the amount of sound absorption desired. Such boards are drilled with a multiple spindle apparatus to form perforations substantially ½ inch on centers so that a square foot of tile has from about 300 to about 484 perforations. The fibrous material causes rapid wear of the drills, so that the drills have to be changed frequently. In an economical operation, the down time for removing and inserting new drills must be very short.

In drilling fiber board to produce acoustical correction material, an arrangement of the type disclosed in Patent No. 2,684,093 may be employed. Some arrangement must be used to move the fiber board into and out of the drilling apparatus. The platen 26 for removing the drills 12 must have the same general pattern of openings 28 as the drill arrangement in the drilling apparatus. A socket for each drill must be provided so that the sockets will grip the drills when the drills are turned in the reverse direction to that used in drilling.

In Figure 1 there is shown drilling apparatus including a head 10 in which are secured drills 12. The use of hollow drills with tapered ends 18, having waste material discharge opening 16 is desirable. The drills are threaded at 14 so that they can be removably secured in the drill head. Generally the type of drills shown in Figure 3 have a right hand thread at 14 and are screwed into the drill head. To remove the drill, it would be turned to the left. A drilling apparatus similar to that shown in U.S. Patent No. 2,615,525 may be used. To remove the drilling waste a vacuum line is attached to the drill head at 20. The arrangement shown in Figure 1 includes a raisable and lowerable table or plate 22 having openings 24 therein. The platen 26 is moved under the drill head 10 and positioned so that the drills are aligned with the openings 28. The openings 28 must be of such a diameter as to provide a close fit for the spring 32. By way of example, the spring 32 is 1 15/16 inches long and made of wire of .055 inch diameter coiled right handed. The first three or four turns 36 has a pitch of about ⅛ of an inch and the remainder of the turns has a pitch of about 3/16 of an inch. The inside diameter of a spring 32 is equal to the outside diameter of the drill end about half way up the taper 18.

The diameter of the openings 28 should be about the diameter of a spring, plus about .035 inch. The three or four top turns of the spring constitute a chuck arrangement that tightens because of friction and takes hold of the drill so that it may be turned out of the drill head. These turns are closely spaced as shown in Figure 2. The remainder of the turns are spaced further apart to permit the drill to compress the spring as the drill is turned out of the threads in the head of the drilling apparatus. The spring, as shown in Figure 2, may be considered to have two sections, the chuck section with the turns of one pitch and the take-up section with the turns of a greater pitch. To prevent turning of the spring 32 in the opening 28 the end 38 of the spring extends into recess 30. This may be accomplished also by the arrangement shown in Figure 4 wherein the end of each spring contacts member 40 positioned in the lower end of the opening 28.

There are a number of ways to properly position the platen 26 under the drill head. The preferred arrangement is to provide the drill press with a bushing plate 42. This plate is provided with an opening for each drill and there is a bushing 44 for each opening. The bushing plate is suitably secured to the drill head 10 by members 46 or the like. When the drills are to be removed the bushing plate is lowered to the position shown in dotted lines Figure 5. The platen 26 is positioned under drill head between members 46 of the bushing plate 42. The table or plate 22 can be indexed to receive projections 27 of the platen 26.

In operation, the platen 26 is moved into position under the drill head and the drill head lowered to drilling position. The tapered end of each drill 18 enters the spring 32. The direction rotation of the drills is reversed from the direction used in drilling and the end 936 of the spring grips the drill and quickly removes it from the head. The springs grip the drills when lowered to such springs and upon the rotating of the drill chuck clockwise, as viewed from below, quickly remove the drills from the chuck. The platen is then moved from under the drill head with the drills held by the springs 32. Generally the direction of rotation of the drill during drilling is in right hand direction. The upper end of the drill at 14 has a right hand thread so that the drill will not be turned out of the head during drilling operations rotating to the right. In such a case, to remove the drill, it is necessary to turn the drill to the left. The direction of rotation of the drills may be either right end or left hand depending on the arrangement of the drill head. Drill heads to produce this result are illustrated in Patent 2,096,233 of 1937 and 2,615,525 of 1952.

What is claimed is:

1. A drill removing means for a multiple spindle apparatus comprising a platen having openings therein for the reception of coil springs, a coiled spring having an open end for the reception of a drill in each opening, said coiled springs having a minor portion of the coils adjacent the outer end spaced a less distance apart axially than the major portion of said coils, and means at the inner ends of said coil springs for preventing rotation of the inner ends of the springs in the said openings.

2. A drill removing means for a multiple spindle drilling apparatus comprising a platen having openings therein for the reception of coil springs; a coiled spring having an open outer end for the reception of a drill in each opening in said platen, said coiled springs having a minor portion of the coils adjacent the open ends spaced a less distance apart axially than the remaining major portion of the coils of the springs, means for securing the inner ends of the coil springs against rotation.

3. A drill removing means for a drilling apparatus comprising a plate having an opening therein for reception of a coiled spring, a coiled spring in the opening in said plate and having an open outer end for receiving a drill bit; said coiled spring having a minor portion of the coils adjacent the open drill receiving end spaced a less distance apart axially than the remaining major portion of the coils of said spring, said spring at the end opposite the drill bit receiving end having means for preventing turning of the coiled spring in the plate opening.

References Cited in the file of this patent
UNITED STATES PATENTS

| | | |
|---|---|---|
| 2,234,789 | Wunderlich | Mar. 11, 1941 |
| 2,356,835 | Duckett | Aug. 29, 1944 |
| 2,378,618 | Burt | June 17, 1945 |
| 2,664,021 | Clayson | Dec. 29, 1953 |
| 2,684,093 | Enzmann et al. | July 20, 1954 |
| 2,805,590 | Nelson | Sept. 10, 1957 |